United States Patent [19]

Collins

[11] 3,764,219
[45] Oct. 9, 1973

[54] TESTING TOOL FOR DETERMINING THE BORESIGHT RETENTION OF WEAPONS BRACKETS AND NIGHT VISION SIGHTS

[75] Inventor: Robert H. Collins, Alexandria, Va.

[73] Assignee: The United States of America as represented by the Secretary of the Army, Washington, D.C.

[22] Filed: June 12, 1972

[21] Appl. No.: 261,857

[52] U.S. Cl. ............... 356/138, 33/245, 33/250
[51] Int. Cl. ......... F41g 1/38, F41g 1/54, F41g 3/32
[58] Field of Search ............... 356/138, 153, 172; 33/245, 250, 261

[56] References Cited
UNITED STATES PATENTS

| | | | |
|---|---|---|---|
| 3,294,963 | 12/1966 | Carn | 356/138 |
| 2,567,535 | 9/1951 | Willis et al. | 33/250 |
| 2,368,954 | 2/1945 | Weaver | 33/245 |
| 3,555,687 | 2/1970 | Joseph | 33/245 |

Primary Examiner—Ronald L. Wibert
Assistant Examiner—S. K. Morrison
Attorney—Harry M. Saragovitz et al.

[57] ABSTRACT

A testing tool that includes a light weight, highly accurate telescope and supplemental weights used to duplicate the weights of various night vision sights. The testing tool is mounted on a weapons adapter bracket for testing the accuracy of either or both the sight and the bracket. The supplemental weights include a main body block and auxiliary side weights in which the auxiliary side weights are bolted traversely through the main body block. The telescope is connected to one side of the main body block. The side of the main body block opposite the telescope is bottomed out on the bottom and beveled edges of a rectangular channel in a weapons adapter bracket. The weapons adapter bracket is connected to a weapon.

5 Claims, 5 Drawing Figures

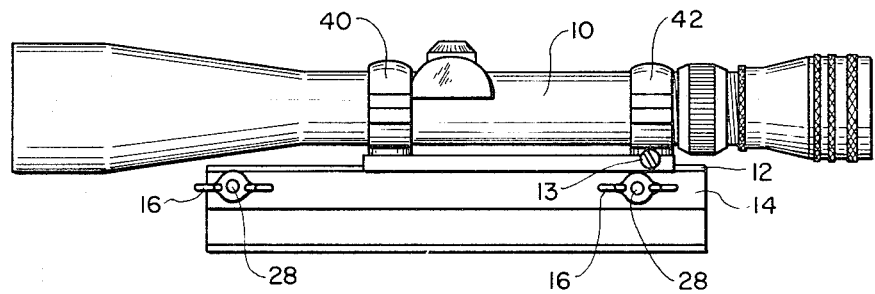
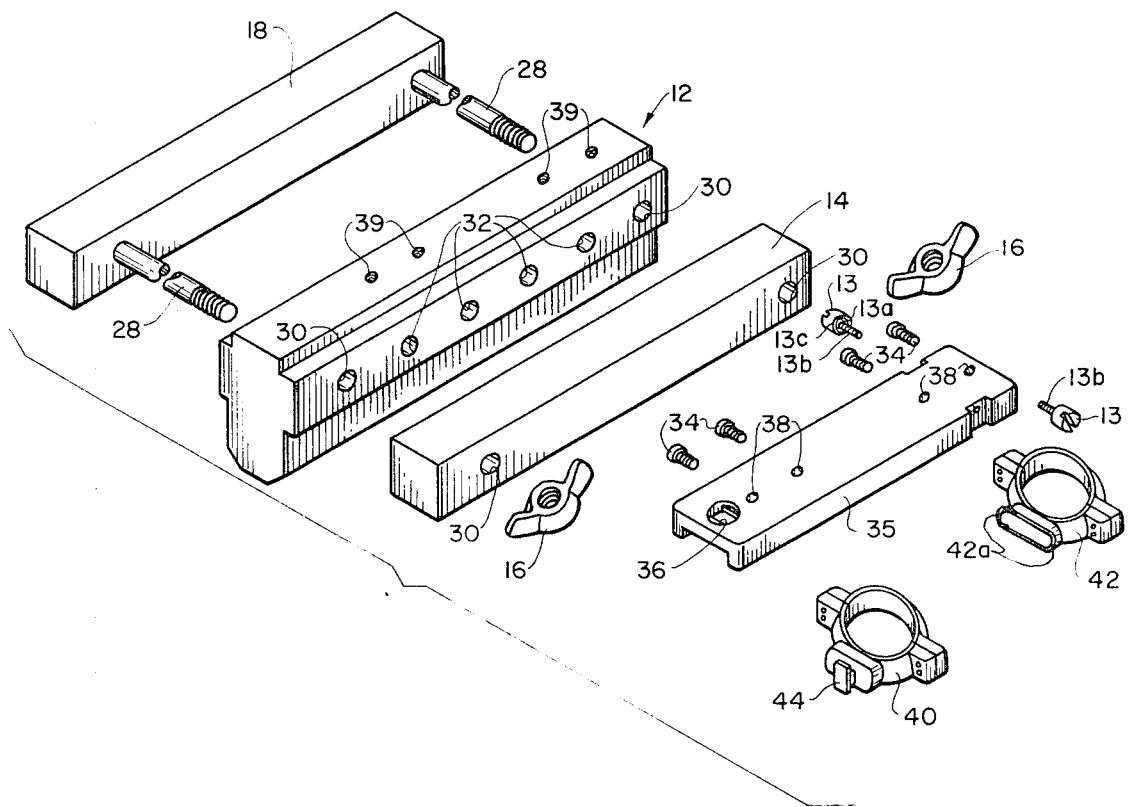

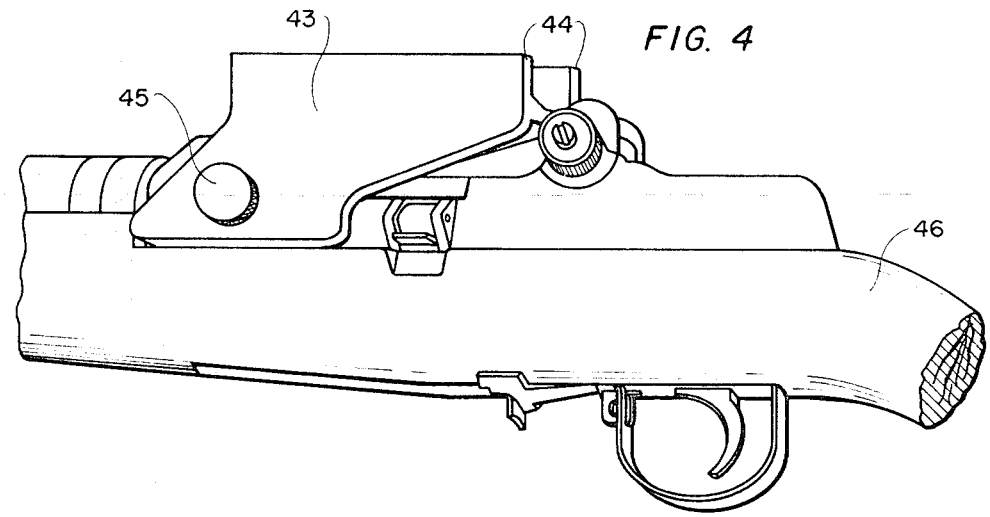
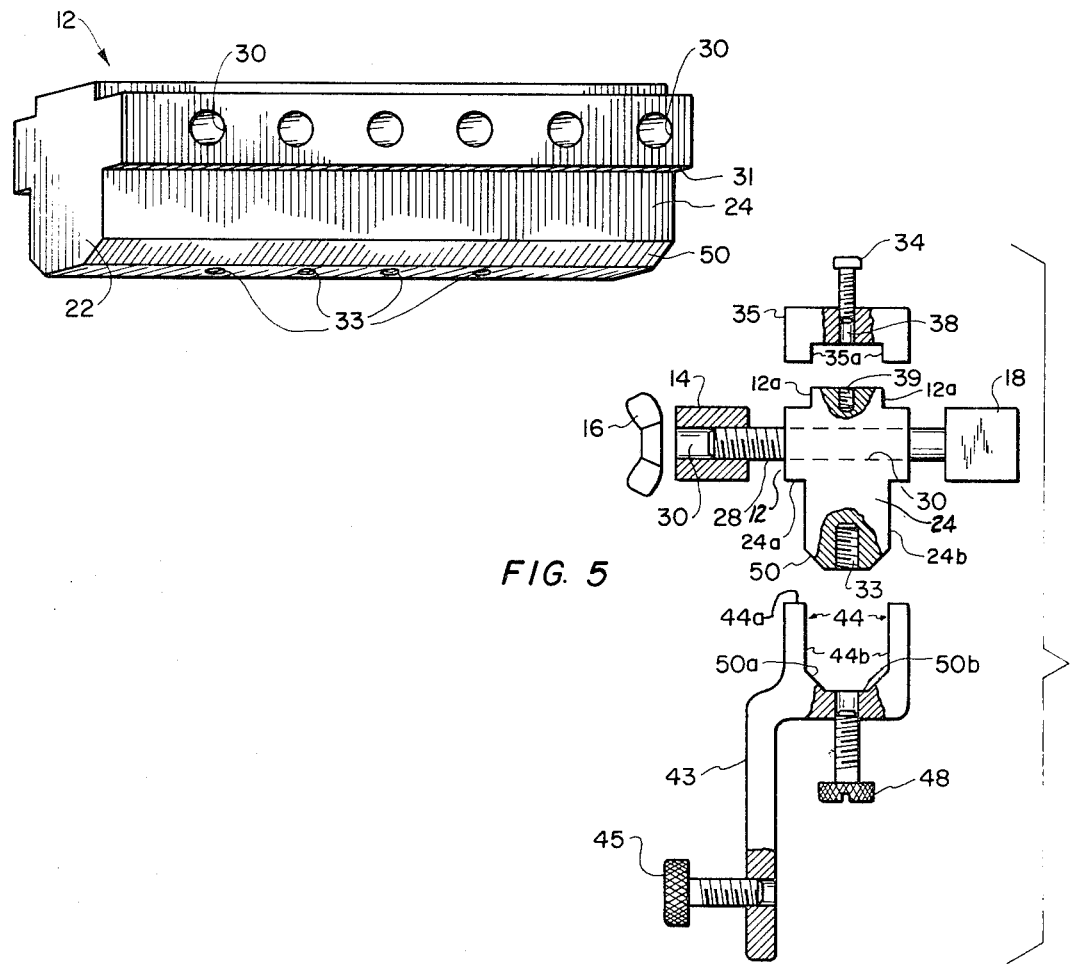

TESTING TOOL FOR DETERMINING THE BORESIGHT RETENTION OF WEAPONS BRACKETS AND NIGHT VISION SIGHTS

The invention described herein may be manufactured, used, and licensed by or for the Government for governmental purposes without the payment to me of any royalty thereon.

BACKGROUND OF THE INVENTION

When firing military weapons, such as rifles or machine guns, using a night vision sight mounted thereon, many times either the night vision sight or the weapons adapter bracket upon which the sight is connected to the weapon, become misaligned. It is of essence that misalignment problems occuring in the field be corrected in the field, possibly at the division maintenance level rather than for the weapon to be sent back to some rear area. The testing tool of the present invention may be easily transported along with the weapons to facilitate quick, accuracy tests.

SUMMARY OF THE INVENTION

The testing tool of the present invention comprises a small telescope and supplemental weights with the supplemental weights including a main body weight and auxiliary side weights. The telescope is mounted on one side of the main body weight with the opposite side of the main body weight mating with a weapons adapter bracket connected to the weapon. The telescope is screw mounted to the main body weight. The combined telescope and main body weight are also screw connected to the bottom of a beveled rectangular chanel portion of the weapons adapter bracket. The side of the main body weight in contact with the rectangular channel portion of weapons adapter bracket is beveled for mating with the channel of the weapons adapter bracket. The beveled fittings prevent lateral motion of the telescope.

When required to simulate the exact weight of the night vision sight under test, auxiliary side weights are bolted traversely through the main body weight.

BRIEF DESCRIPTION OF THE DRAWINGS

FIG. 1 illustrates the telescope and supplemental weights of the present invention as they are mounted together;

FIG. 2 shows the supplemental weights and telescope mounting bracket and rings;

FIG. 3 illustrates another view of the main body weight;

FIG. 4 shows a weapon adapter bracket mounted on a weapon; and

FIG. 5 shows a detailed view of the supplemental weights, the telescope mounting bracket, and the weapons adapter bracket.

DETAILED DESCRIPTION OF THE PREFERRED EMBODIMENT

Referring to FIG. 1, the telescope 10 and a portion of the supplemental weights are shown. Other drawings in this disclosure show the complete assemblage of the weights and how they are attached to telescope 10 and to the weapon. Telescope 10 is a Redfield 3X–9X variable slope 1-inch tube diameter. This telescope is light weight and is highly accurate. However, other light weight, highly accurate telescopes may be used. Main body block 12 and one auxiliary weight 14 are shown in FIG. 1. Another auxiliary weight (not shown) is positioned on the opposite side of main body block 12 from auxiliary weight 14. Block 12 and the auxiliary weights may be made of steel.

FIG. 2 illustrates the supplemental weights and the telescope mounting attachments. Auxiliary side weight 18 has two bolts 28 for passing through holes 30 in main body block 12 and holes 30 in auxiliary side weight 14. Wing nuts 16 are threadably attached to the ends of bolts 28 for securing auxiliary weights 14 and 18 to the main body block 12. After weights 14 and 18 are attached, telescope mounting bracket 35 is attached to main body block 12. Bracket 35 may be a modified Redfield WIN–100 steel base mount. Bracket 35 is modified by cutting an elongated slot through the entire length of the side adjacent main body block 12 such that the two sides fit tightly together. Bracket 35 is attached to block 12 by screws 34 passing through holes 38 in mounting bracket 35 and are threadably connected to threaded holes 39 of block 12. Bracket 35 is mounted on block 12 with opening 36 in the forwardmost position of the weapon. Prior to mounting telescope 10 on bracket 35, rings 40 and 42 are mounted on the telescope. Rings 40 and 42 are shown in FIG. 2 as two half rings connected together by screw means. Rings 40 and 42 are commercially available. For example, Redfield produces typical rings for mounting the Redfield 3X–9X variable slope 1-inch tube diameter telescope. Ring 40 is mounted on telescope 10 in the forwardmost position such that flattened head 44 on ring 40 sets down in opening 36 with the telescope turned at a right angle to bracket 35. The telescope is then turned 90° so that the wings of head 44 are locked down within opening 36 and the telescope is aligned in the operating position. The telescope is then secured to bracket 35 by screws 13 threadably connected to bracket 35. Each of screws 13 has a recessed portion 13a next to its stem 13b that forms an extended edge 13c around the screw. Edge 13c fits over a circular arc milled out portion on the bottom edge of each side of ring 42. The milled out portion forms a projected edge 42a that fits into sunken portion 13a when screw 13 is tightly secured to bracket 35.

FIG. 3 illustrates the main body block 12 shown without any attachments thereto. Beveled edges 50 (one which is not shown in FIG. 3) will be explained later in this disclosure. Lower portion 24 of block 12 has threaded holes 33 on its bottom surface and long beveled sections 22 at each end. The utility of the beveled edges 50, beveled sections 22, and threaded holes 33 will be explained later.

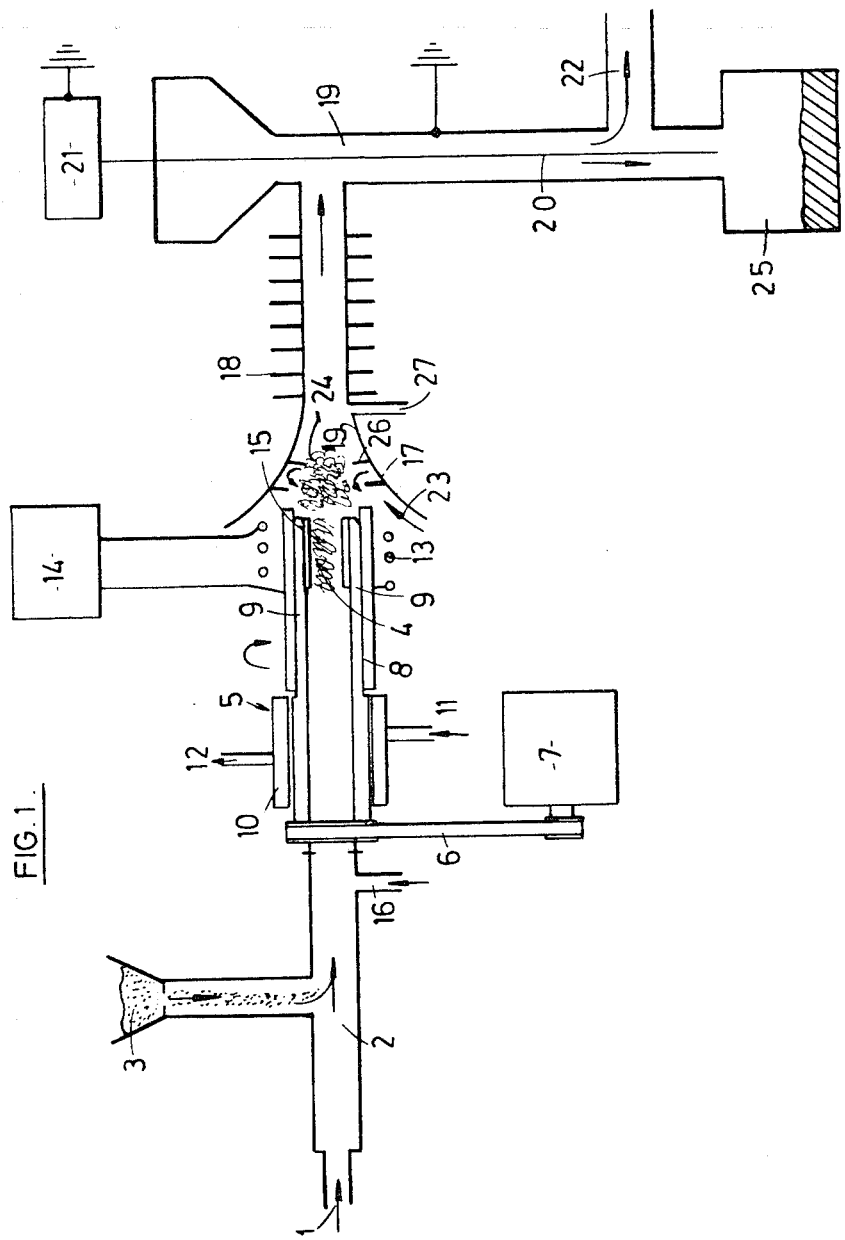

In FIG. 4, the weapons adapter bracket 43 is shown mounted on a hand rifle weapon 46. Bracket 43 is attached to rifle 46 by attaching screw 45. Bracket 43 includes an open elongated channel formed by sides 44. FIG. 5 shows a much better illustration of bracket 43. The channel has a flat bottom 50b with beveled edges 50a on each side bottom 50b and sides 44. The night vision sight being tested also fits down in the channel and is attached to bracket 43 by about three screws 48 (only one being shown in FIG. 5). Screws 48 are threadably connected to the night vision sight by threaded holes in the bottom of the sight. When telescope 10 and the supplemental weights of the present invention are placed in the channel for testing boresight alignment of a typical weapon such as 46 the main body block 12 has threaded holes 33 therein for ac-